(12) United States Patent
Kim et al.

(10) Patent No.: US 10,133,129 B2
(45) Date of Patent: Nov. 20, 2018

(54) DISPLAY SUBSTRATE AND LIQUID CRYSTAL DISPLAY DEVICE COMPRISING THE SAME

(71) Applicant: SAMSUNG DISPLAY CO., LTD., Yongin-si, Gyeonggi-do (KR)

(72) Inventors: Jeongki Kim, Hwaseong-si (KR); Hongbeom Lee, Hwaseong-si (KR); Junyoung Jung, Seoul (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 53 days.

(21) Appl. No.: 15/245,544

(22) Filed: Aug. 24, 2016

(65) Prior Publication Data

US 2017/0192315 A1 Jul. 6, 2017

(30) Foreign Application Priority Data

Jan. 6, 2016 (KR) .................. 10-2016-0001750

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 2001/133742* (2013.01); *G02F 2001/133757* (2013.01); *G02F 2001/134345* (2013.01); *G02F 2201/121* (2013.01); *G02F 2201/122* (2013.01); *G02F 2201/123* (2013.01)

(58) Field of Classification Search
CPC .............................................. G02F 1/134309
See application file for complete search history.

(56) References Cited

U.S. PATENT DOCUMENTS

| 2003/0193625 | A1* | 10/2003 | Yoshida | G02F 1/134336 349/43 |
| 2010/0019998 | A1* | 1/2010 | You | G02F 1/133707 345/87 |
| 2010/0097535 | A1* | 4/2010 | Inoue | G02F 1/133707 349/38 |
| 2015/0029449 | A1 | 1/2015 | Woo et al. | |

(Continued)

FOREIGN PATENT DOCUMENTS

| KR | 10-2015-0014197 A | 2/2015 |
| KR | 10-2015-0043097 A | 4/2015 |
| KR | 10-2015-0047399 A | 5/2015 |

*Primary Examiner* — Nathanael R Briggs
*Assistant Examiner* — Alexander Gross
(74) *Attorney, Agent, or Firm* — Lee & Morse, P.C.

(57) ABSTRACT

A display substrate includes a base substrate including pixel areas in a first direction and a pixel electrode. The pixel electrode includes a sub-pixel electrode including first and second unit electrodes connected by a first connector, and a first slit non-parallel to the first direction between the first and second unit electrodes. The first unit electrode includes a first vertical stem portion at a side of the pixel area, and a first horizontal stem portion including an end connected to the first vertical stem portion and an end adjacent to a first vertical stem portion of an adjacent pixel electrode. The second unit electrode includes a second vertical stem portion at another side of the pixel area, and a second horizontal stem portion including an end connected to the second vertical stem portion and another end adjacent to a second vertical stem portion of another adjacent pixel electrode.

20 Claims, 11 Drawing Sheets

(56) References Cited

U.S. PATENT DOCUMENTS

2015/0098049 A1    4/2015   Lee
2015/0103296 A1    4/2015   Kwak et al.
2015/0116625 A1    4/2015   Hwang et al.

* cited by examiner

DISPLAY SUBSTRATE AND LIQUID CRYSTAL DISPLAY DEVICE COMPRISING THE SAME

CROSS-REFERENCE TO RELATED APPLICATION

Korean Patent Application No. 10-2016-0001750, filed on Jan. 6, 2016, in the Korean Intellectual Property Office, and entitled: "Display Substrate and Liquid Crystal Display Device Comprising the Same," is incorporated by reference herein in its entirety.

BACKGROUND

1. Field

Exemplary embodiments of the invention relate to a display substrate and a liquid crystal display ("LCD") device including the display substrate. The display substrate may be curved.

2. Description of the Related Art

Display devices are classified into LCD devices, organic light emitting diode ("OLED") display devices, plasma display panel ("PDP") devices, electrophoretic display ("EPD") devices, and the like, based on a light emitting scheme thereof.

Among the types of display devices, an LCD device includes two substrates opposing each other and a liquid crystal layer interposed between the two substrates. In the LCD device, an electric field is applied over the liquid crystal layer between the two substrates, an intensity of the electric field is then adjusted so that an amount of transmitted light through the substrate is controlled, and thereby an image may be displayed on the LCD device.

A curved LCD device may provide a curved display area, may provide a user with a stereoscopic sense, a sense of immersion, and realism.

SUMMARY

Embodiments are directed to a display substrate including a base substrate including a plurality of pixel areas disposed in a first direction and a pixel electrode in a pixel area of the plurality of pixel areas. The pixel electrode includes a first sub-pixel electrode. The first sub-pixel electrode includes a first unit electrode, a second unit electrode spaced apart from the first unit electrode, a first connector connecting the first unit electrode and the second unit electrode, and a first slit providing a distanced space between the first unit electrode and the second unit electrode, the first slit being not parallel to the first direction. The first unit electrode includes a first vertical stem portion at a side of the pixel area, and a first horizontal stem portion connected to the first vertical stem portion. The second unit electrode includes a second vertical stem portion at another side of the pixel area, and a second horizontal stem portion connected to the second vertical stem portion. The first horizontal stem portion includes an end connected to the first vertical stem portion and another end adjacent to a first vertical stem portion of an adjacent pixel electrode. The second horizontal stem portion includes an end connected to the second vertical stem portion and another end adjacent to a second vertical stem portion of another adjacent pixel electrode.

The first unit electrode may include a plurality of first branch portions and a plurality of second branch portions that oppose one another, respectively, with respect to the first horizontal stem portion. The second unit electrode may include a plurality of third branch portions and a plurality of fourth branch portions that oppose one another, respectively, with respect to the second horizontal stem portion.

The first branch portions, the second branch portions, the third branch portions, and the fourth branch portions may be disposed sequentially in a second direction that intersects the first direction.

A width of a second domain, which is defined as a disposition area of the plurality of second branch portions, may decrease in relation to a distance from the first vertical stem portion. A width of a third domain, which is defined as a disposition area of the plurality of third branch portions, may decrease in relation to a distance from the second vertical stem portion.

A width of a second domain, which is defined as a disposition area of the plurality of second branch portions, may increase in relation to a distance from the first vertical stem portion. A width of a third domain, which is defined as a disposition area of the plurality of third branch portions, may increase in relation to a distance from the second vertical stem portion.

At least one second branch portion of the plurality of second branch portions and at least one third branch portion of the plurality of third branch portions may be connected to one another by the first connector.

The first slit may be at an angle ranging from about 5 degrees (°) to about 45° with respect to the first direction.

The pixel electrode may further include a second sub-pixel electrode. The second sub-pixel electrode may include a third unit electrode, a fourth unit electrode spaced apart from the third unit electrode, a second connector connecting the third unit electrode and the fourth unit electrode, and a second slit providing a distanced space between the third unit electrode and the fourth unit electrode, the second slit not being parallel to the first direction. The third unit electrode may include a third vertical stem portion at a side of the pixel area and a third horizontal stem portion connected to the third vertical stem portion. The fourth unit electrode may include a fourth vertical stem portion at another side of the pixel area and a fourth horizontal stem portion connected to the fourth vertical stem portion. The third horizontal stem portion may include an end connected to the third vertical stem portion and another end adjacent to a third vertical stem portion of the adjacent pixel electrode. The fourth horizontal stem portion may include an end connected to the fourth vertical stem portion and another end adjacent to a fourth vertical stem portion of the other adjacent pixel electrode.

The third unit electrode may include a plurality of fifth branch portions and a plurality of sixth branch portions that oppose one another, respectively, with respect to the third horizontal stem portion. The fourth unit electrode may include a plurality of seventh branch portions and a plurality of eighth branch portions that oppose one another, respectively, with respect to the fourth horizontal stem portion.

The fifth branch portions, the sixth branch portions, the seventh branch portions, and the eighth branch portions may be disposed sequentially in a second direction that intersects the first direction.

A width of a sixth domain, which is defined as a disposition area of the plurality of sixth branch portions, may decrease in relation to a distance from the third vertical stem portion. A width of a seventh domain, which is defined as a disposition area of the plurality of seventh branch portions may decrease in a direction away from the fourth vertical stem portion.

A width of the sixth domain, which is defined as a disposition area of the plurality of sixth branch portions, may increase in relation to a distance from the third vertical stem portion. A width of the seventh domain, which is defined as a disposition area of the plurality of seventh branch portions, may increase in relation to a distance from the fourth vertical stem portion.

At least one sixth branch portion of the plurality of sixth branch portions and at least one seventh branch portion of the plurality of seventh branch portions may be connected to one another by the second connector.

The second slit may be at an angle ranging from about 5° to about 45° with respect to the first direction.

The display substrate may further include a shielding electrode between pixel electrodes that are adjacent to one another, the shielding electrode extending along the first direction.

Embodiments are also directed to a liquid crystal display (LCD) device including a display substrate, an opposing substrate opposing the display substrate, and a liquid crystal layer between the display substrate and the opposing substrate. The display substrate includes a base substrate including a plurality of pixel areas disposed in a first direction, and a pixel electrode in the pixel area. The pixel electrode includes a first sub-pixel electrode, the first sub-pixel electrode including a first unit electrode, a second unit electrode spaced apart from the first unit electrode, a first connector connecting the first unit electrode and the second unit electrode, and a first slit providing a distanced space between the first unit electrode and the second unit electrode, the first slit not being parallel to the first direction. The first unit electrode includes a first vertical stem portion at a side of the pixel area and a first horizontal stem portion connected to the first vertical stem portion. The second unit electrode includes a second vertical stem portion at another side of the pixel area and a second horizontal stem portion connected to the second vertical stem portion. The first horizontal stem portion includes an end connected to the first vertical stem portion and another end adjacent to a first vertical stem portion of an adjacent pixel electrode. The second horizontal stem portion includes an end connected to the second vertical stem portion and another end adjacent to a second vertical stem portion of another adjacent pixel electrode.

The first unit electrode may include a plurality of first branch portions and a plurality of second branch portions that oppose one another, respectively, with respect to the first horizontal stem portion. The second unit electrode may include a plurality of third branch portions and a plurality of fourth branch portions that oppose one another, respectively, with respect to the second horizontal stem portion.

A width of a second domain, which is defined as a disposition area of the plurality of second branch portions, may decrease in relation to a distance from the first vertical stem portion. A width of a third domain, which is defined as a disposition area of the plurality of third branch portions, may decrease in relation to a distance from the second vertical stem portion.

A width of a second domain, which is defined as a disposition area of the plurality of second branch portions, may increase in relation to a distance from the first vertical stem portion. A width of a third domain, which is defined as a disposition area of the plurality of third branch portions, may increase in relation to a distance from the second vertical stem portion.

The opposing substrate may further include a common electrode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
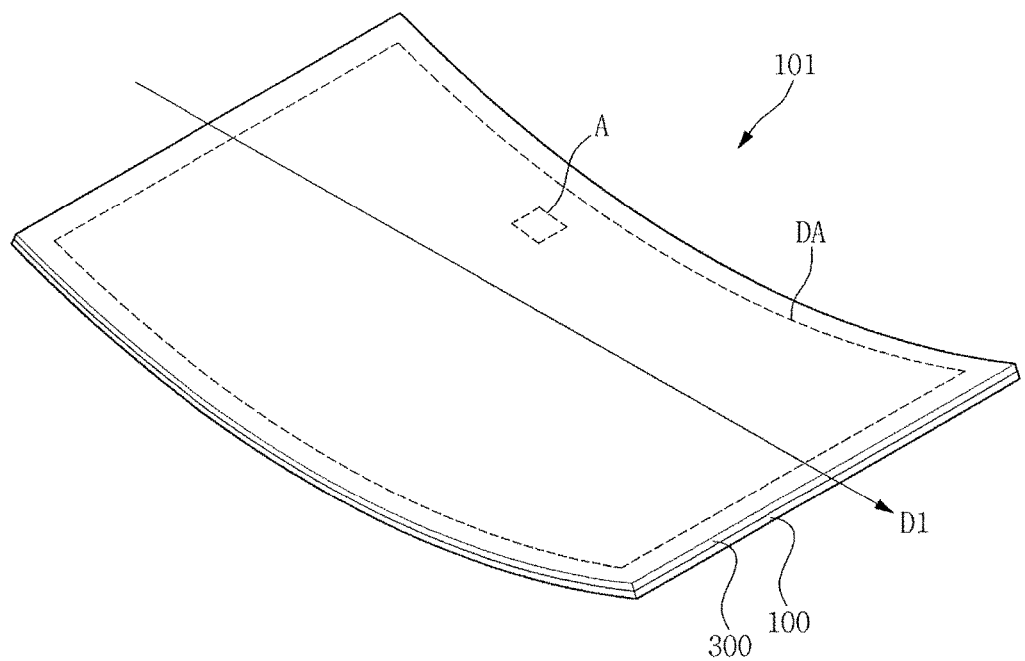
FIG. 1A illustrates a perspective view depicting an exemplary embodiment of a liquid crystal display ("LCD") device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "between" two layers, it can be the only layer between the two layers, or one or more intervening layers may also be present. Like reference numerals refer to like elements throughout.

Throughout the specification, when an element is referred to as being "connected" to another element, the element is "directly connected" to the other element, or "electrically connected" to the other element with one or more intervening elements interposed therebetween. It will be further understood that the terms "includes" and/or "including," when used in this specification, specify the presence of stated features, elements, and/or components, but do not preclude the presence or addition of one or more other features, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, an exemplary embodiment will be described in detail with reference to FIGS. 1, 2, 3, 4, 5, 6, and 7.

Figure 1B:
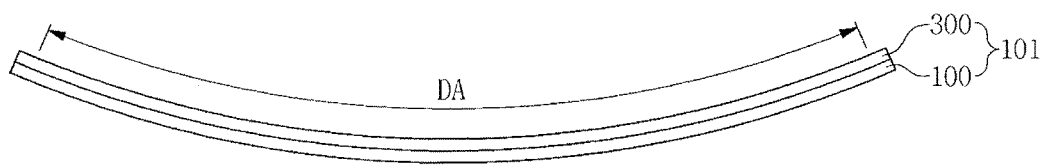
FIG. 1B illustrates a lateral view depicting an exemplary embodiment of the LCD device.

FIG. 1A illustrates a perspective view depicting an exemplary embodiment of a liquid crystal display ("LCD") device 101, and FIG. 1B illustrates a lateral view depicting the exemplary embodiment of the LCD device 101.

Referring to FIGS. 1A and 1B, the exemplary embodiment of the LCD device 101, having an overall curved shape, has a display area DA on which an image is displayed. The LCD device 101 may display an image that is enhanced in terms of a stereoscopic sense, a sense of immersion, and realism, using the display area DA having a curved shape.

Figure 4:
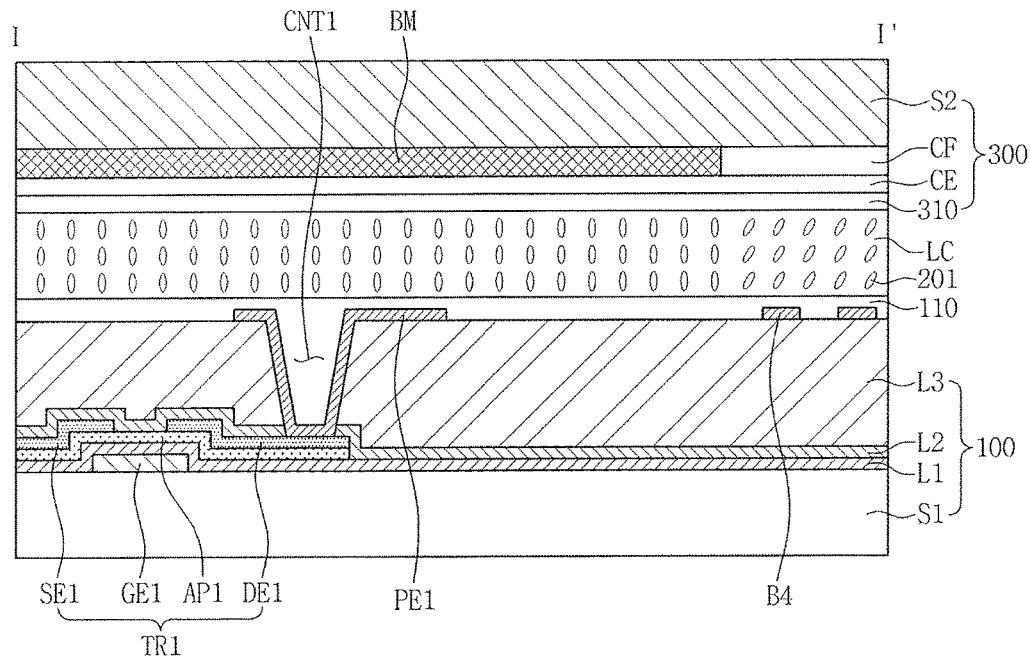
FIG. 4 illustrates a cross-sectional view taken along line I-I' of FIG. 2.

The LCD device 101 may include a display substrate 100, an opposing substrate 300, and a liquid crystal layer LC (refer to FIG. 4). The opposing substrate 300 may oppose the display substrate 100 to be coupled to the display substrate 100. The liquid crystal layer LC may be disposed between the display substrate 100 and the opposing substrate 300.

The LCD device 101 may further include additional configurations or structures in addition to the display substrate 100 and the opposing substrate 300. For example, the LCD device 101 may further include a backlight assembly that outputs light toward the display substrate 100.

The LCD device 101 may be curved along a first direction D1 in a plan view. In the case that the display substrate 100 is in a curved state as compared to the case that the display substrate 100 is in a flat state, a direction in which a distance between opposite ends of the display substrate 100 is reduced will be defined herein as a curved direction. A distance of opposite ends of the display substrate 100 that is curved is reduced along the first direction D1, as compared to the display substrate 100 that is flat, and thus the display substrate 100 is described as being curved along the first direction D1. For example, a portion of or the entirety of the display substrate 100 may have a curved shape along the first direction D1, and the display area DA also may have a curved shape along the first direction D1. Further, the opposing substrate 300 may have a curved shape in accordance with the display substrate 100.

In some implementations, the LCD device 101 and the display substrate 100 may have a flat planar shape.

Figure 2:
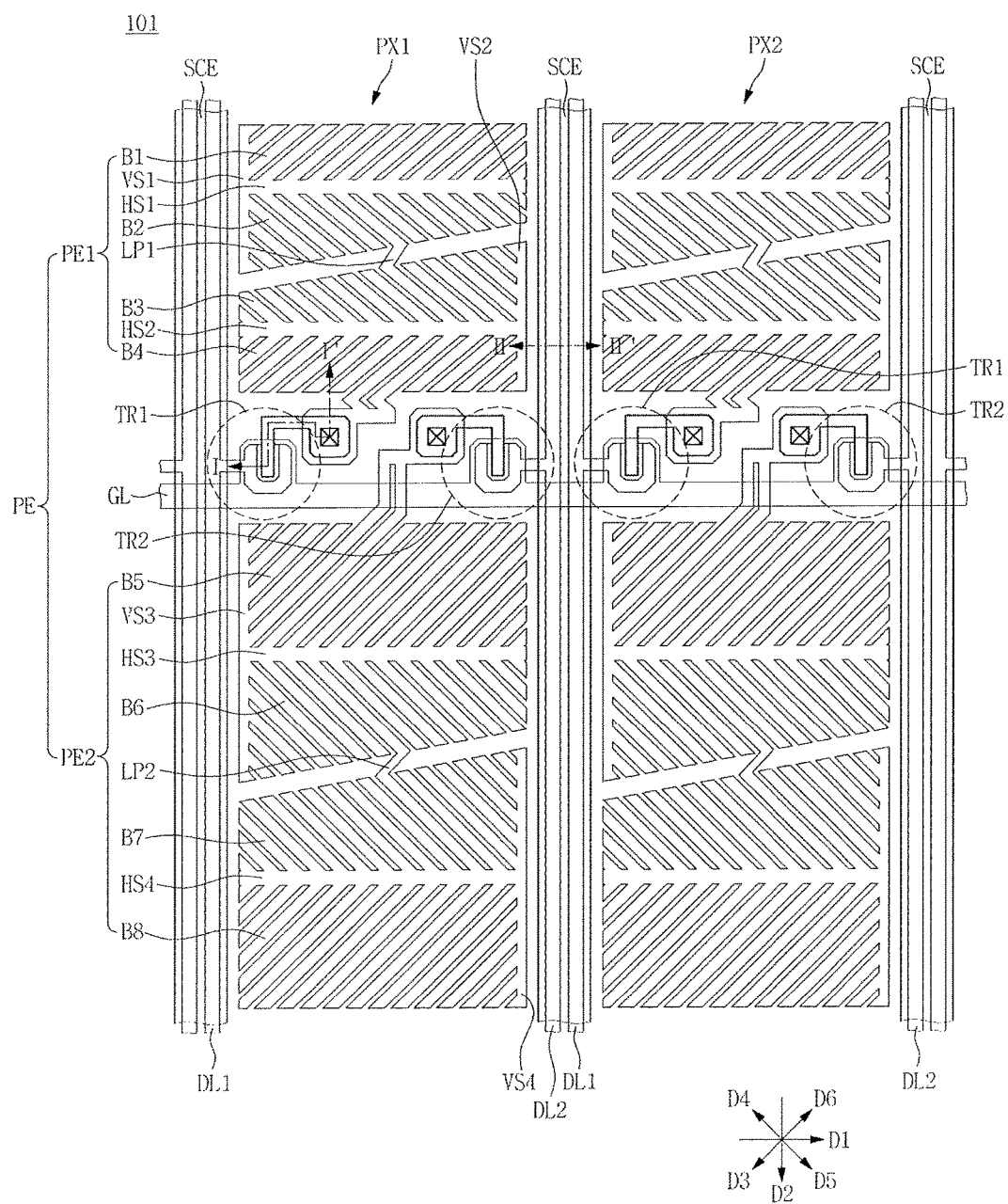
FIG. 2 illustrates a plan view depicting portion "A" of FIG. 1A.
Figure 3:
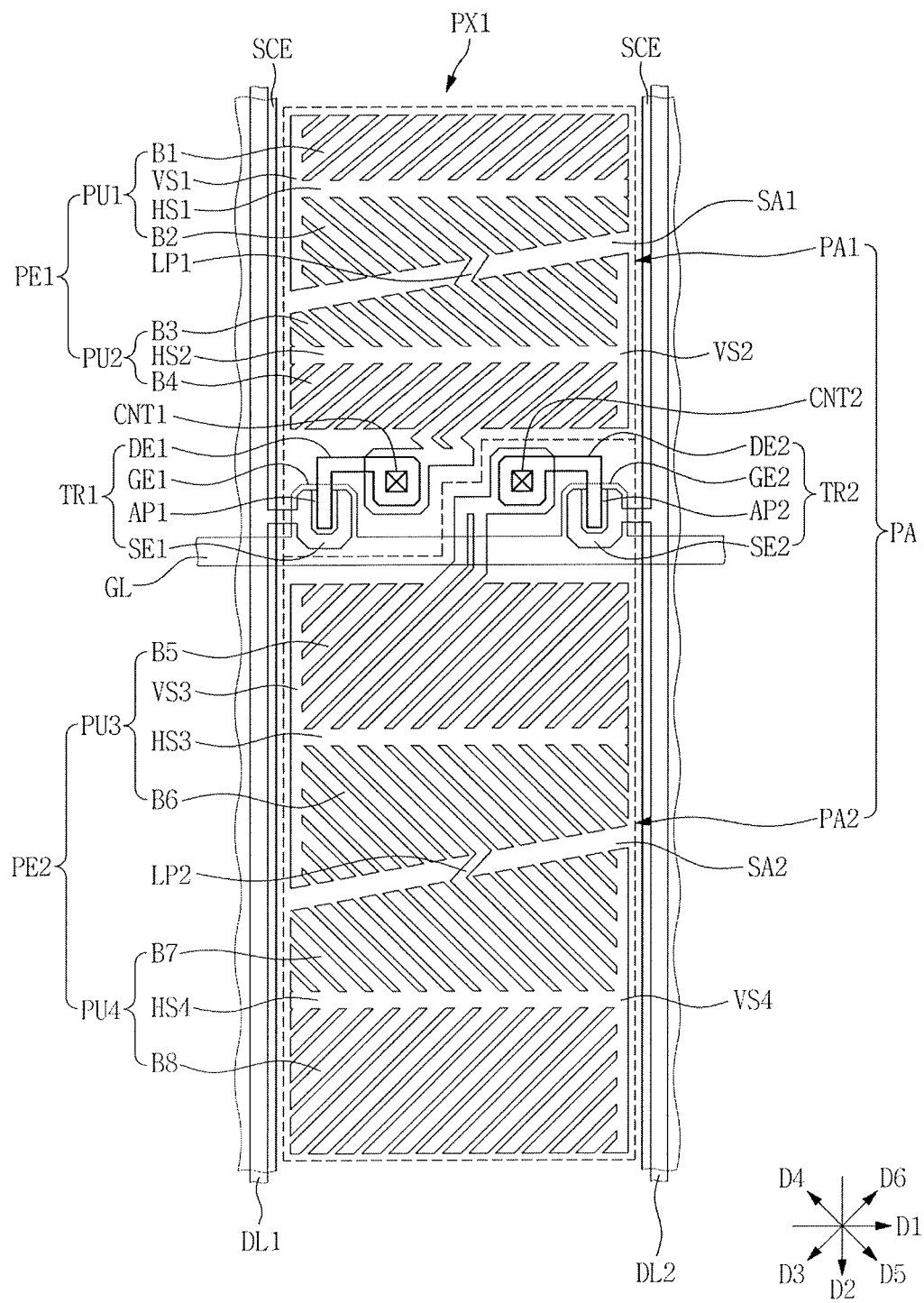
FIG. 3 illustrates a plan view depicting a pixel of the LCD device illustrated in FIG. 1A.
Figure 5:
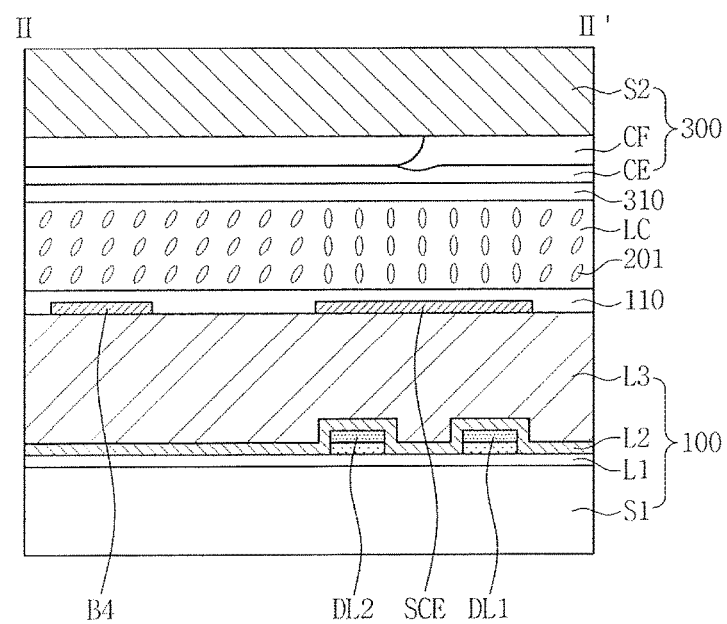
FIG. 5 illustrates a cross-sectional view taken along line II-II' of FIG. 2.

FIG. 2 illustrates a plan view depicting portion "A" of FIG. 1A, FIG. 3 illustrates a plan view depicting a pixel of the LCD device 101 illustrated in FIG. 1A, FIG. 4 illustrates a cross-sectional view taken along line of FIG. 2, and FIG. 5 illustrates a cross-sectional view taken along line II-II' of FIG. 2.

In an exemplary embodiment, the LCD device 101 includes a plurality of pixels. By way of example, two of the plurality of pixels are illustrated in FIG. 2 and one of the plurality of pixels is illustrated in FIG. 3. Further, configurations of the display substrate 100 are mainly illustrated in FIGS. 2 and 3, and configurations of the opposing substrate 300 are mainly illustrated in FIGS. 4 and 5.

Referring to FIGS. 2, 3, 4, and 5, the display substrate 100 may include a base substrate S1, a gate line GL, a first data line DL1, a second data line DL2, a first thin film transistor TR1, a second thin film transistor TR2, a pixel electrode PE, and a first alignment layer 110.

The base substrate S1 may be an insulating substrate, such as a plastic substrate that has light transmitting characteristics and flexibility. In some implementations, the base substrate S1 may include a hard substrate such as a glass substrate.

The base substrate S1 may have a plurality of pixel areas PA positioned along the first direction D1. The pixel electrode PE may be disposed in the pixel area PA.

As shown in FIG. 3, the pixel area PA may include a first sub-pixel area PA1 and a second sub-pixel area PA2. The pixel electrode PE includes a first sub-pixel electrode PE1 in the first sub-pixel area PA1 and a second sub-pixel electrode PE2 in the second sub-pixel area PA2.

The gate line GL may be disposed on the base substrate S1. The gate line GL may be electrically connected to the first and second thin film transistors TR1 and TR2 and may transmit a gate signal to the first and second thin film transistors TR1 and TR2.

The first and second data lines DL1 and DL2 may be insulated from the gate line GL and may be disposed on the base substrate S1. The first data line DL1 may transmit a first data signal, and the second data line DL2 may transmit a second data signal. According to this exemplary embodiment, the first data line DL1 may extend along a side (a left side in the drawings) of the first and second sub-pixel electrodes PE1 and PE2, the second data line DL2 may extend along another side (a right side in the drawings) of the first and second sub-pixel electrodes PE1 and PE2, and the first and second sub-pixel electrodes PE1 and PE2 may be disposed between the first and second data lines DL1 and DL2. According to this exemplary embodiment, the first and second data lines DL1 and DL2 may extend along a second direction D2.

The first thin film transistor TR1 may be electrically connected to the gate line GL, the first data line DL1, and the first sub-pixel electrode PE1. When the first thin film transistor TR1 is turned on by the gate signal, the first data signal may be applied to the first sub-pixel electrode PE1.

The first thin film transistor TR1 may include a first gate electrode GE1, a first active pattern AP1, a first source electrode SE1, and a first drain electrode DE1. The first gate electrode GE1 may branch off from the gate line GL, and the first active pattern AP1 may be disposed on the first gate electrode GE1, having a first insulating layer L1 interposed therebetween. The first source electrode SE1 may branch off from the first data line DL1 to contact the first active pattern AP1, and the first drain electrode DE1 may be spaced apart from the first source electrode SE1 to contact the first active pattern AP1.

Herein, the first insulating layer L1 may also be referred to as a gate insulating layer.

A second insulating layer L2 may cover the first thin film transistor TR1, and a third insulating layer L3 may be disposed on the second insulating layer L2.

The first sub-pixel electrode PE1 may be disposed on the third insulating layer L3 and may contact the first drain electrode DE1 through a first contact hole CNT1 defined through the second and third insulating layers L2 and L3.

The second thin film transistor TR2 may be electrically connected to the gate line GL, the second data line DL2, and the second sub-pixel electrode PE2. When the second thin film transistor TR2 is turned on by the gate signal, the second data signal may be applied to the second sub-pixel electrode PE2.

The second thin film transistor TR2 may include a second gate electrode GE2, a second active pattern AP2, a second source electrode SE2, and a second drain electrode DE2. The second gate electrode GE2 may branch off from the gate line GL, and the second active pattern AP2 may be disposed on the second gate electrode GE2, having the first insulating layer L1 therebetween. The second source electrode SE2 may branch off from the second data line DL2 to contact the second active pattern AP2, and the second drain electrode DE2 may be spaced apart from the second source electrode SE2 to contact the second active pattern AP2.

The second sub-pixel electrode PE2 may be disposed on the third insulating layer L3 and may contact the second drain electrode DE2 through a second contact hole CNT2 defined through the second and third insulating layers L2 and L3.

According to this embodiment, the first and second active patterns AP1 and AP2 may each include a semiconductor material such as amorphous silicon or crystalline silicon. In some implementations, the first and second active patterns AP1 and AP2 may each include an oxide semiconductor, such as IGZO, ZnO, $SnO_2$, $In_2O_3$, $Zn_2SnO_4$, $Ge_2O_3$ or $HfO_2$, or a compound semiconductor, such as GaAs, GaP or InP.

As described above, the first and second thin film transistors TR1 and TR2 may be turned on by the gate signal. The first data signal may be applied to the first sub-pixel electrode PE1 through the first thin film transistor TR1, and the second data signal may be applied to the second sub-pixel electrode PE2 through the second thin film transistor TR2. The first and second sub-pixel electrodes PE1 and PE2 may be driven by different data signals, such that, different gray levels may be displayed in the first and second sub-pixel areas PA1 and PA2, respectively. In some implementations, the first and second sub-pixel electrodes PE1 and PE2 may be driven by a same data signal.

The first alignment layer 110 may be disposed on the pixel electrode PE to contact the liquid crystal layer LC.

In the absence of an electric field between the display substrate 100 and the opposing substrate 300, the first alignment layer 110 may align liquid crystal molecules 201 included in the liquid crystal layer LC with an inclination with respect to the first alignment layer 110. In such an example, the liquid crystal molecules 201 that are aligned with an inclination by the first alignment layer 110 may further be tilted upon application of an electric field to thereby be aligned in a direction horizontal to the display substrate 100. A mode of the liquid crystal molecules 201 operated in such a manner is referred to as a super vertical alignment ("SVA") mode. When the SVA mode is applied, a response time in which the LCD device 101 displays an image is relatively short.

The opposing substrate 300 may include an opposing base substrate S2, a color filter CF, a light blocking layer BC, a common electrode CE, and a second alignment layer 310.

The opposing base substrate S2 may be an insulating substrate having light transmitting characteristics and flexibility. In some implementations, the opposing base substrate S2 may include a hard substrate such as a glass substrate.

The common electrode CE may be disposed on the opposing base substrate S2. The common electrode CE may generate, along with the pixel electrode PE, an electric field over the liquid crystal layer LC. The light blocking layer BM may be disposed on a portion of the opposing base substrate S2 corresponding to positions of the gate line GL and the first and second thin film transistors TR1 and TR2. The light blocking layer BM may block light. The color filter CF may be disposed on the opposing base substrate S2. The color filter CF may filter a color of light transmitted through the liquid crystal layer LC.

Although configurations of the light blocking layer BM and the color filter CF are illustrated as both being disposed on the opposing base substrate S2 in FIGS. 4 and 5 by way of example, in some implementations, at least one of the light blocking layer BM and the color filter CF may be disposed on the base substrate S1.

The first sub-pixel electrode PE1 may include a first horizontal stem portion HS1, a second horizontal stem portion HS2, a first vertical stem portion VS1, a second vertical stem portion VS2, a plurality of first branch portions B1, a plurality of second branch portions B2, a plurality of third branch portions B3, and a plurality of fourth branch portions B4. Herein, with regard to the first and second pixels PX1 and PX2, and the corresponding first and second sub-pixel electrodes PE1 and PE2, the terms "vertical" and "horizontal" may be understood with reference to the plan views illustrated in FIGS. 2, 3, 7, and 8, wherein the term "horizontal" corresponds to a direction D1 from one side of the drawing page to the other side, and the term "vertical" corresponds to a direction D2 between a top and bottom of the drawing page. Unless otherwise indicated, the term "vertical" does not require an extension in a direction out of or into the page.

Referring to FIGS. 2 and 3, the first vertical stem portion VS1 may be connected to the first horizontal stem portion HS1, a portion of the plurality of first branch portions B, and a portion of the plurality of second branch portions B. The second vertical stem portion VS2 may be connected to the second horizontal stem portion HS2, a portion of the plurality of third branch portions B3, and a portion of the plurality of fourth branch portions B4. According to this exemplary embodiment, each of the first and second vertical stem portions VS1 and VS2 may extend in the second direction D2 that intersects the first direction D1 in which the LCD device 101 is curved. For example, the second direction D2 is perpendicular to the first direction D1 in a plan view.

The first horizontal stem portion HS1 is connected to the first vertical stem portion VS1, a portion of the plurality of first branch portions B1, and a portion of the plurality of second branch portions B2. The first horizontal stem portion HS1 may branch off from a central portion of the first vertical stem portion VS1 to extend in the first direction D1. The plurality of first branch portions B1 may extend in a direction symmetrical to a direction in which the plurality of second branch portions B2 extend with respect to the first horizontal stem portion HS1.

Figure 6:
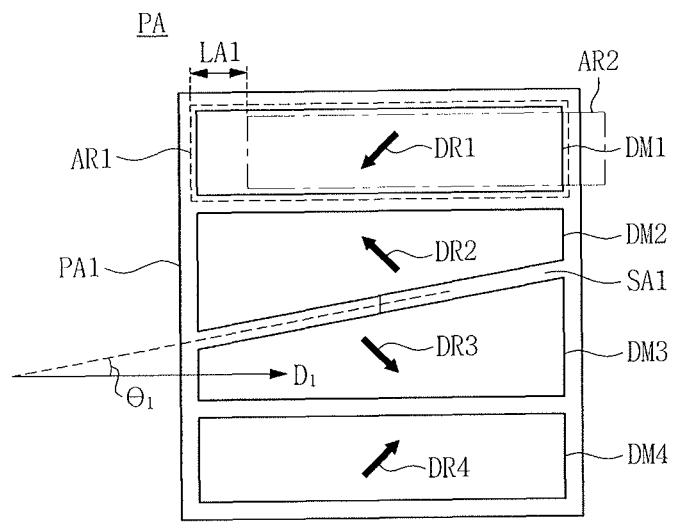
FIG. 6 illustrates a schematic view depicting domains defined in a pixel area and alignment directions of liquid crystals.
Figure 6:
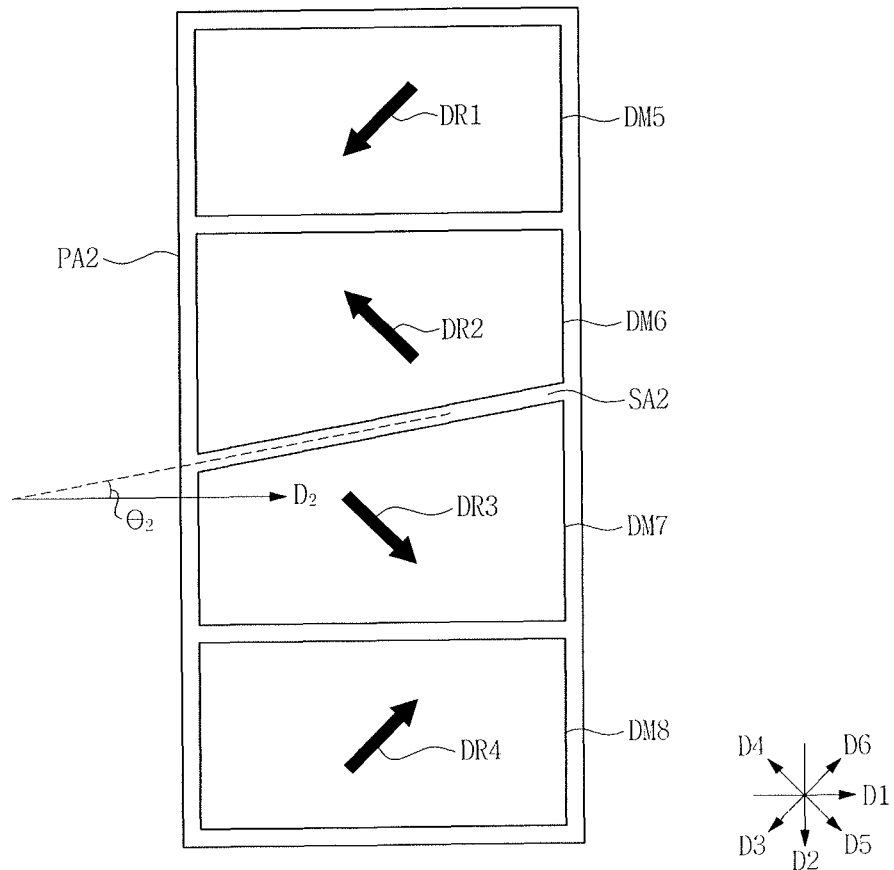

Referring to FIG. 6, the first horizontal stem portion HS1 may be disposed between a first domain DM1 and a second domain DM2.

The second horizontal stem portion HS2 may be connected to the second vertical stem portion VS2, the plurality of third branch portions B3, and the plurality of fourth branch portions B4. The second horizontal stem portion HS2 may branch off from a central portion of the second vertical stem portion VS2 to extend in a direction opposite to the first direction D1. The plurality of third branch portions B3 may extend in a direction symmetrical to a direction in which the plurality of fourth branch portions B4 extend with respect to the second horizontal stem portion HS2.

Referring to FIG. 6, the second horizontal stem portion HS2 may be disposed between a third domain D3 and a fourth domain DM4.

A portion of the plurality of first branch portions B1 may branch off from the first horizontal stem portion HS1, and another portion of the plurality of first branch portions B1 branch off from the first vertical stem portion VS1. In addition, each of the plurality of first branch portions B1 may extend in a third direction D3 between the first direction D1 and the second direction D2 in a plan view, and the plurality of first branch portions B1 may be arranged to be spaced apart from one another.

A portion of the plurality of second branch portions B2 may branch off from the first horizontal stem portion HS1, and another portion of the plurality of second branch portions B2 branch off from the first vertical stem portion VS1. Each of the plurality of second branch portions B2 extends in a fourth direction D4 between the first direction D1 and the second direction D2 in a plan view, and the plurality of second branch portions B2 may be arranged to be spaced apart from one another.

The fourth direction D4 may intersect the third direction D3 in a plan view. For example, the third direction D3 may be perpendicular to the fourth direction D4 in a plan view. Each of the third direction D3 and the fourth direction D4 may be at an angle of about 45 degrees with respect to the first direction D1 or the second direction D2 in a plan view.

The first vertical stem portion VS1, the first horizontal stem portion HS1, the plurality of first branch portions B1, and the plurality of second branch portions B2 define a first unit electrode PU1.

A portion of the plurality of third branch portions B3 may branch off from the second horizontal stem portion HS2, and another portion of the plurality of third branch portions B3 may branch off from the second vertical stem portion VS2. Each of the plurality of third branch portions B3 may extend in a fifth direction D5 between the first direction D1 and the second direction D2 in a plan view. The plurality of third branch portions B3 may be arranged to be spaced apart from one another.

A portion of the plurality of fourth branch portions B4 may branch off from the second horizontal stem portion HS2, and another portion of the plurality of fourth branch portions B4 may branch off from the second vertical stem portion VS2. Each of the plurality of fourth branch portions B4 may extend in a sixth direction D6 between the first direction D1 and the second direction D2 in a plan view. The plurality of fourth branch portions B4 are arranged to be spaced apart from one another.

The sixth direction D6 may intersect the fifth direction D5 in a plan view. For example, the fifth direction D5 may be perpendicular to the sixth direction D6 in a plan view. Each of the fifth direction D5 and the sixth direction D6 may be at an angle of about 45 degrees with respect to the first direction D1 or the second direction D2 in a plan view.

The second vertical stem portion VS2, the second horizontal stem portion HS2, the plurality of third branch portions B3, and the plurality of fourth branch portions B4 define a second unit electrode PU2.

The first sub-pixel electrode PE1 may further include a first connecting portion LP1. The first connecting portion LP1 may be disposed between the second domain DM2 and the third domain DM3 to connect the second branch portion B2 and the third branch portion B3. The first connecting portion LP1 may be disposed in a central portion of a first slit SA1 between the second domain DM2 and the third domain DM3. At least one of the plurality of second branch portions B2 and at least one of the plurality of third branch portions B3 may be connected to one another by the first connecting portion LP1.

The first sub-pixel electrode PE1 may include the first unit electrode PU1, the second unit electrode PU2 spaced apart from the first unit electrode PU1, and the first connecting portion LP1 connecting the first unit electrode PU1 and the second unit electrode PU2. A distanced space between the first unit electrode PU2 and the second unit electrode PU2 defines the first slit SA1. The first slit SA1 may extend in a direction that is not parallel to the first direction D1. The first slit SA1 may correspond to a first border portion between the first unit electrode PU1 and the second unit electrode PU2.

A size of the second sub-pixel electrode PE2 may be the same as or different from a size of the first sub-pixel electrode PE1. In addition, a shape of the second sub-pixel electrode PE2 may be similar or complementary to a shape of the first sub-pixel electrode PE1.

The second sub-pixel electrode PE2 may include a third horizontal stem portion HS3, a fourth horizontal stem portion HS4, a third vertical stem portion VS3, a fourth vertical stem portion VS4, a plurality of fifth branch portions B5, a plurality of sixth branch portions B6, a plurality of seventh branch portions B7, and a plurality of eighth branch portions B8.

The third vertical stem portion VS3 may extend in the second direction D2 to be connected to the third horizontal stem portion HS3, the plurality of fifth branch portions B5, and the plurality of sixth branch portions B6. The fourth vertical stem portion VS4 may extend in the second direction D2 to be connected to the fourth horizontal stem portion HS4, the plurality of seventh branch portions B7, and the plurality of eighth branch portions B8.

The third horizontal stem portion HS3 may branch off from the third vertical stem portion VS3 to extend in the first direction D1, and the fourth horizontal stem portion HS4 may branch off from the fourth vertical stem portion VS4 to extend in a direction opposite to the first direction D1. The third horizontal stem portion HS3 may branch off from a central portion of the third vertical stem portion VS3, and the fourth horizontal stem portion HS4 may branch off from a central portion of the fourth vertical stem portion VS4.

A portion of the plurality of fifth branch portions B5 may branch off from the third horizontal stem portion HS3, and another portion of the plurality of fifth branch portions B5 may branch off from the third vertical stem portion VS3. Each of the plurality of fifth branch portions B5 may be parallel to the third direction D3. The plurality of fifth branch portions B5 may be spaced apart from one another.

A portion of the plurality of sixth branch portions B6 may branch off from the third horizontal stem portion HS3, and another portion of the plurality of sixth branch portions B6 may branch off from the third vertical stem portion VS3. Each of the plurality of sixth branch portions B6 may be parallel to the fourth direction D4. The plurality of sixth branch portions B6 may be spaced apart from one another.

A portion of the plurality of seventh branch portions B7 may branch off from the fourth horizontal stem portion HS4, and another portion of the plurality of seventh branch portions B7 may branch off from the fourth vertical stem portion VS4. Each of the plurality of seventh branch portions B7 may be parallel to the fifth direction D5. The plurality of seventh branch portions B7 may be spaced apart from one another.

A portion of the plurality of eighth branch portions B8 may branch off from the fourth horizontal stem portion HS4, and another portion of the plurality of eighth branch portions B8 may branch off from the fourth vertical stem portion VS4. Each of the plurality of eighth branch portions B8 may be parallel to the sixth direction D6. The plurality of eighth branch portions B8 may be spaced apart from one another.

The second sub-pixel electrode PE2 may further include a second connecting portion LP2. The second connecting portion LP2 may be disposed between the third domain DM3 and the fourth domain DM4 to connect the sixth branch portion B6 and the seventh branch portion B7. The second connecting portion LP2 may be disposed in a central portion of a second slit SA2 between the sixth domain DM6 and the seventh domain DM7. At least one of the plurality of sixth branch portions B6 and at least one of the seventh branch portions B7 may be connected to one another by the second connecting portion LP2.

The third vertical stem portion VS3, the third horizontal stem portion HS3, the plurality of fifth branch portions B5, and the plurality of sixth branch portions B6 define a third unit electrode PU3. The fourth vertical stem portion VS4, the fourth horizontal stem portion HS4, the plurality of seventh branch portions B7, and the plurality of eighth branch portions B8 define a fourth unit electrode PU2.

The second sub-pixel electrode PE2 may include the third unit electrode PU3, the fourth unit electrode PU4 spaced apart from the third unit electrode PU3, and the second connecting portion LP2 connecting the third unit electrode PU3 and the fourth unit electrode PU4. A distanced space between the third unit electrode PU3 and the fourth unit electrode PU4 defines the second slit SA2, which may extend in a direction that is not parallel to the first direction D1. The second slit SA2 may correspond to a second border portion between the third unit electrode PU3 and the fourth unit electrode PU4.

FIG. 6 illustrates a schematic view depicting domains defined in a pixel area and alignment directions of liquid crystals.

When the first, second, third, fourth, fifth, sixth, seventh, and eighth branch portions B1, B2, B3, B4, B5, B6, B7, and B8 have configurations illustrated in FIG. 3, the first, second, third, and fourth domains DM1, DM2, DM3, and DM4 (refer to FIG. 6) may be defined in the first sub-pixel area PA1, and fifth, sixth, seventh, and eighth domains DM5, DM6, DM7, and DM8 may be defined in the second sub-pixel area PA2.

For example, the first domain DM1 may be defined as an area to include the plurality of first branch portions B1, the second domain DM2 may be defined as an area to include the plurality of second branch portions B2, the third domain DM3 may be defined as an area to include the plurality of third branch portions B3, the fourth domain DM4 may be defined as an area to include the plurality of fourth branch portions B4, the fifth domain DM5 may be defined as an area to include the plurality of fifth branch portions B5, the sixth domain DM6 may be defined as an area to include the plurality of sixth branch portions B6, the seventh domain DM7 may be defined as an area to include the plurality of seventh branch portions B7, and the eighth domain DM8 may be defined as an area to include the plurality of eighth branch portions B8.

The first, second, third, and fourth domains DM1, DM2. DM3, and DM4 may be disposed sequentially along the second direction D2. Likewise, the fifth, sixth, seventh, and eighth domains DM5, DM6, DM7, and DM8 may be disposed sequentially along the second direction D2.

The first domain DM1 may be defined as an area in which liquid crystal molecules 201 are aligned by the plurality of first branch portions B1. In this case, a liquid crystal alignment direction DR1 in the first domain DM1 will may correspond to the third direction D3. The second domain DM2 may be defined as an area in which liquid crystal molecules 201 are aligned by the plurality of second branch portions B2, and in this case, a liquid crystal alignment direction DR2 in the second domain DM2 may correspond to the fourth direction D4.

Similarly thereto, the liquid crystal alignment direction DR3 in the third domain DM3 may correspond to the fifth direction D5, and the liquid crystal alignment direction DR4 in the fourth domain DM4 may correspond to the sixth direction D6.

The first, second, third, and fourth domains DM1, DM2, DM3, and DM4 may be aligned in the first sub-pixel area PA1 sequentially along the second direction D2, and the liquid crystal alignment directions in respective ones of the first, second, third, and fourth domains DM1, DM2, DM3, and DM4 may be different from one another. Accordingly, a viewing range with respect to the first sub-pixel area PA1 may expand.

Similarly thereto, the fifth, sixth, seventh, and eighth domains DM5, DM6, DM7, and DM8 may be aligned in the second sub-pixel area PA2 sequentially along the second direction D2, and the liquid crystal alignment directions in respective ones of the fifth, sixth, seventh, and eighth domains DM5, DM6, DM7, and DM8 may be different from one another. Accordingly, a viewing range with respect to the second sub-pixel area PA2 may expand.

When the LCD device 101 is curved along the first direction D1, misalignment may occur between the display substrate 100 and the opposing substrate 300. For example, the display substrate 100 and the opposing substrate 300 may be misaligned by a first length LA1 along the first direction D1.

However, in the exemplary embodiment of the LCD device 101, the first, second, third, fourth, fifth, sixth, seventh, and eighth domains DM1, DM2, DM3, DM4, DM5, DM6, DM7, and DM8 may be arranged in the second direction D2 that is perpendicular to the first direction D1, and thus alignment defects of the liquid crystal molecules 201 may not occur.

For example, an area in which the liquid crystal molecules 201 are aligned by the first alignment layer 110 on the display substrate 100 may be defined as a lower alignment area AR1, and an area in which the liquid crystal molecules 201 are aligned by the second alignment layer 310 on the opposing substrate 300 may be defined as an upper alignment area AR2. Liquid crystal alignment directions of the upper alignment area AR1 and the lower alignment area AR2 may be the same as one another. If the opposing substrate 300 were to move in the first direction D1 by the first length LA1 such that a position of the lower alignment area AR1 does not entirely correspond to a position of the upper alignment area AR2, the lower alignment area AR1 and the upper alignment area AR2 that have the same liquid crystal alignment direction may still overlap each other in the first domain DM1. For example, in the first domain DM1, the lower alignment area AR1 does not overlap another upper alignment area that is aligned in a direction different from the first liquid crystal alignment direction DR1. Accordingly, alignment defects of the liquid crystal molecules 201 may not occur in response to a misalignment occurring in the first direction D1. Thus, texture effects based on the alignment defects may not be visible and light transmittance degradation in portions of each domain may not occur.

Referring to FIGS. 2 and 5, a shielding electrode SCE may be disposed between the first pixel PX1 and the second pixel PX2 that are adjacent to each other. As illustrated in FIG. 2, the shielding electrode SCE may extend in the second direction D2 along the first and second data lines DL1 and DL2.

The shielding electrode SCE, similarly to the first and second sub-pixel electrodes PE1 and PE2, may be disposed on the third insulating layer L3. For example, the shielding electrode SCE may be disposed on a layer that is the same as a layer on which the first and second sub-pixel electrodes PE1 and PE2 are disposed. The shielding electrode SCE may be spaced apart from the first and second sub-pixel electrodes PE1 and PE2 to be electrically insulated from the first and second sub-pixel electrodes PE1 and PE2.

The shielding electrode SCE and the first and second sub-pixel electrodes PE1 and PE2 may include the same material and may be manufactured in the same process. The shielding electrode SCE, the first sub-pixel electrode PE1, and the second sub-pixel electrode PE2 may include a transparent conductive oxide (TCO). For example, the shielding electrode SCE, the first sub-pixel electrode PE1, and the second sub-pixel electrode PE2 may include at least one selected from indium tin oxide (ITO), indium zinc oxide (IZO), aluminum zinc oxide (AZO), or indium gallium zinc oxide (IGZO).

According to this exemplary embodiment, the shielding electrode SCE may have a width that covers the first and second data lines DL1 and DL2. A voltage having the same potential as that of a common voltage applied to the common electrode CE may be applied to the shielding electrode SCE. Accordingly, an electric field is not generated between the shielding electrode SCE and the common electrode CE. When the liquid crystal layer LC includes negative liquid crystal molecules 201, the liquid crystal molecules 201 may be aligned vertically with respect to a surface of the shielding electrode SCE in the absence of an electric field.

When the liquid crystal molecules 201 are vertically aligned, light applied from a backlight assembly may be blocked by the liquid crystal molecules 201 that are vertically aligned. For example, the shielding electrode SCE may serve to block light applied from the backlight assembly. Accordingly, a light blocking layer BM may be omitted from a portion of the opposing base substrate S2 corresponding to the shielding electrode SCE. In other implementations, the light blocking layer BM may be disposed on a portion of the opposing base substrate S2 corresponding to the shielding electrode SCE.

When the display substrate 100 includes the shielding electrode SCE, even if misalignment were to occur between the display substrate 100 and the opposing substrate 300, a light blocking area provided by the shielding electrode SCE would not be shifted into the pixel area PA. Accordingly, a vertically linear dark portion would not be generated in the LCD device 101.

Figure 7:
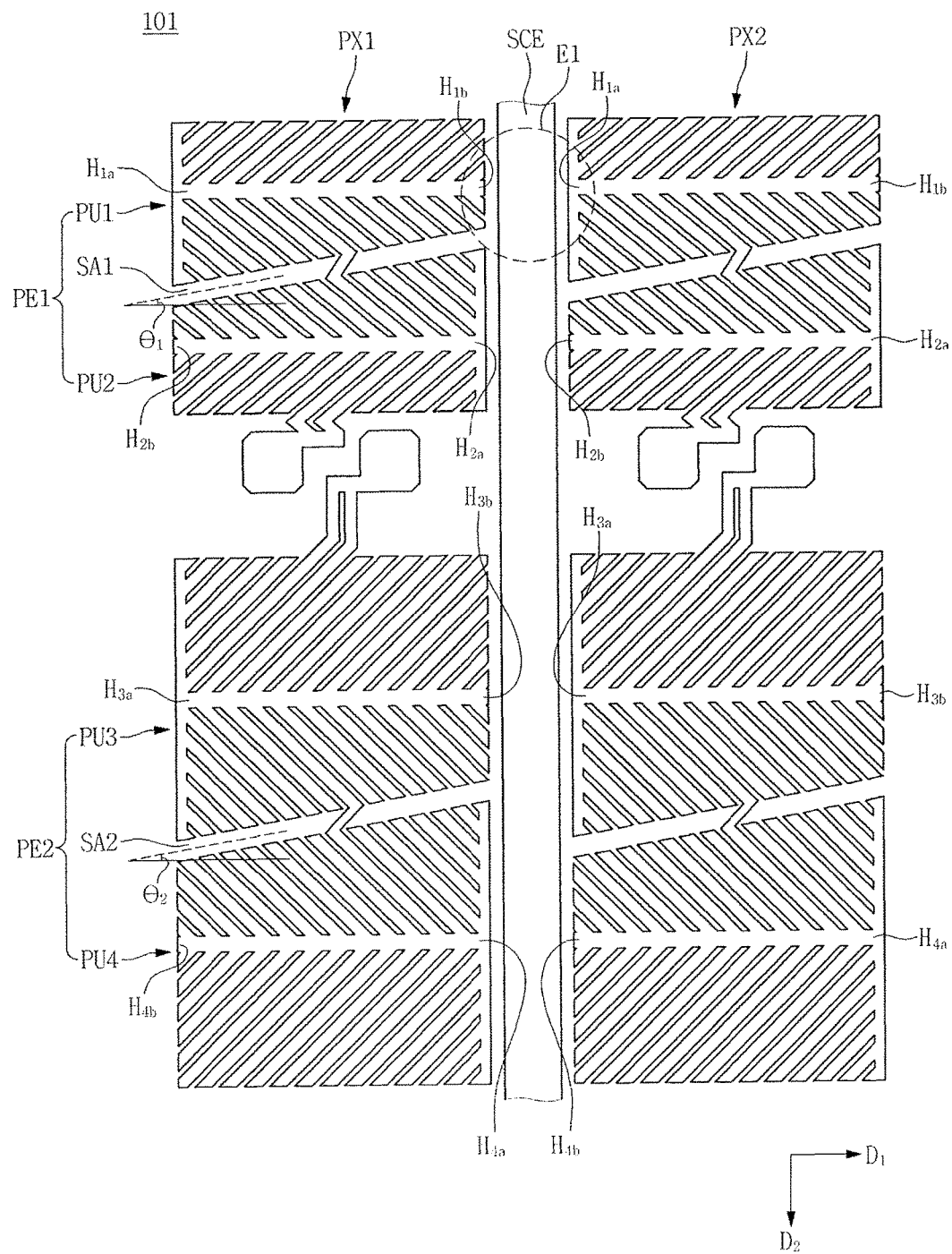
FIG. 7 illustrates a plan view depicting a pixel electrode and a shielding electrode illustrated in FIG. 2.

FIG. 7 illustrates a plan view depicting a pixel electrode and a shielding electrode illustrated in FIG. 2.

Referring to FIGS. 6 and 7, the first slit SA1, which is a distanced space having a slit shape and which separates and distinguishes the first unit electrode PU1 from the second unit electrode PU2, may be at a predetermined angle $\theta_1$ with respect to the first direction D1. For example, the first slit SA1 may be in a straight line such that an angle with respect to the first direction may be determined. The angle $\theta_1$ may be an angle in a range of about 5 degrees (°) to about 45° with respect to the first direction D1. For example, the first slit SA1 may be at an angle $\theta_1$ in a range of about 5° to about 30° with respect to the first direction D1.

The first direction D1 may be referred to as a length direction of a domain, and the second direction D2 may be referred to as a width direction of the domain. Accordingly, the width of the domain may be defined as a range in which the domain is positioned along the second direction.

A width of the second domain DM2, which is defined as a disposition area of the plurality of second branch portions B2, may decrease in relation to a distance from the first vertical stem portion VS1. For example, a length of the plurality of second branch portions B2 may decrease in relation to a distance from the first vertical stem portion VS1.

A width of the third domain DM3, which is defined as a disposition area of the plurality of third branch portions B3, may decrease in relation to a distance from the second vertical stem portion VS2. For example, a length of the plurality of third branch portions B3 in relation to a distance from the second vertical stem portion VS2.

According to this exemplary embodiment, the first vertical stem portion VS1 may be disposed at a side (a left side in the drawings) of the pixel area PA, and the second vertical stem portion VS2 may be disposed at another side (a right side in the drawings) of the pixel area PA. For example, the first vertical stem portion VS1 and the second vertical stem portion VS2 may be disposed opposite to each other in the pixel area PA. Accordingly, although the width of the second domain DM2 decreases in relation to a distance from the first vertical stem portion VS1 and the width of the third domain DM3 also decreases, in relation to a distance from the second vertical stem portion VS2, a total area of the second domain DM2 and the third domain DM3 may correspond to a rectangular shape.

According to this exemplary embodiment, the first vertical stem portions VS1 of the adjacent first and second pixels PX1 and PX2 may be disposed so as not to be adjacent to one another. In addition, the second vertical stem portions VS2 of the adjacent first and second pixels PX1 and t PX2 may be disposed so as not to be adjacent to one another.

For example, an end H1$a$ of the first horizontal stem portion HS1 may be connected to the first vertical stem portion VS1, and another end H1$b$ of the first horizontal stem portion HS1 may be adjacent to the first vertical stem portion VS1 of an adjacent pixel electrode. An end $H_{2a}$ of the second horizontal stem portion HS2 may be connected to the second vertical stem portion VS2, and another end $H_{2b}$ of the second horizontal stem portion HS2 may be adjacent to the second vertical stem portion VS2 of another adjacent pixel electrode. Accordingly, the first vertical stem portion VS1 of the first pixel PX1 may be adjacent to ends of branch portions of the first unit electrode PU1 in an adjacent second pixel PX2 (refer to E1 of FIG. 7). Similarly thereto, the second vertical stem portion VS2 of the first pixel PX1 may be adjacent to ends of branch portions of the second unit electrode PU2 in the adjacent second pixel PX2.

For example, if the first vertical stem portions VS1 of the adjacent first and second pixel PX1 and PX2 were to be disposed to be adjacent to one another, the first vertical stem portion VS2, the first horizontal stem portion HS1, the plurality of first branch portions B1 and the plurality of second branch portions B2 would be be disposed densely in an area where the first vertical stem portions VS1 are adjacently disposed. When various elements constituting electrodes are disposed densely in a relatively small area, there is a high possibility that defects may occur in a photoresist pattern in a process of forming a pixel electrode PE using a photoresist. For example, the photoresist may reflow in the process of forming the pixel electrode PE using the photoresist, such that defects may occur whereby electrode-forming materials remain in the pixel electrode PE.

According to this exemplary embodiment, the first vertical stem portions VS1 of the adjacent first and second pixels PX1 and PX2 may be disposed so as not to be adjacent to one another (refer to E1 of FIG. 7) such that defects of the photoresist pattern and defects of the pixel electrode PE may be significantly reduced or prevented in the process of forming the pixel electrode PE.

Similarly thereto, the third vertical stem portions VS3 of the adjacent first and second pixels PX1 and PX2 may be disposed so as not to be adjacent to one another, and the fourth vertical stem portions VS4 of the adjacent first and second pixels PX1 and PX2 may be disposed so as not to be adjacent to one another.

For example, an end $H_3a$ of the third horizontal stem portion HS3 may be connected to the third vertical stem portion VS3, and another end $H_3b$ of the third horizontal stem portion HS3 may be adjacent to the third vertical stem portion VS3 of an adjacent pixel electrode. An end $H_4a$ of the fourth horizontal stem portion HS4 may be connected to the fourth vertical stem portion VS4, and another end $H_4b$ of the fourth horizontal stem portion HS4 may be adjacent to the fourth vertical stem portion VS4 of an adjacent pixel electrode. Accordingly, the third vertical stem portion VS3 of the first pixel PX1 may be adjacent to ends of branch portions of the third unit electrode PU3 in the second pixel PX2 that is adjacent to the first pixel PX1. Similarly thereto, the fourth vertical stem portion VS4 of the first pixel PX1 may be adjacent to ends of branch portions of the fourth unit electrode PU4 in the second pixel PX2 that is adjacent to the first pixel PX1.

The third vertical stem portion VS3 and the fourth vertical stem portion VS4 may be disposed in opposite portions of the pixel area PA. The third vertical stem portion VS3 may be disposed at a side (a left side in the drawings) of the pixel area PA, and the second vertical stem portion VS2 may be disposed at another side (a right side in the drawings) of the pixel area PA.

The second slit SA2, which is a distanced space having a slit shape and which which separates and distinguishes the third unit electrode PU3 from the fourth unit electrode PU4 may be a predetermined angle $\theta_2$ with respect to the first direction D1. For example, the second slit SA2 may be in a straight line such that an angle with respect to the first direction may be determined. The angle $\theta_2$ may be an angle in a range of about 5° to about 45° with respect to the first direction D1. For example, the second slit SA2 be at an angle $\theta_2$ in a range of about 5° to about 30° with respect to the first direction D1.

A width of the sixth domain DM6 may decrease in relation to a distance from the third vertical stem portion VS3, and a width of the seventh domain DM7 may decrease in relation to a distance from the fourth vertical stem portion VS4. A length of the plurality of sixth branch portions B6 may decrease in relation to a distance from the third vertical stem portion VS3, and a length of the plurality of seventh branch portions B7 may decrease in relation to a distance from the fourth vertical stem portion VS4.

Hereinafter, another exemplary embodiment will be described with reference to FIG. 8. In order to avoid redundancy, descriptions pertaining to the configurations described hereinabove will not be repeated.

Figure 8:
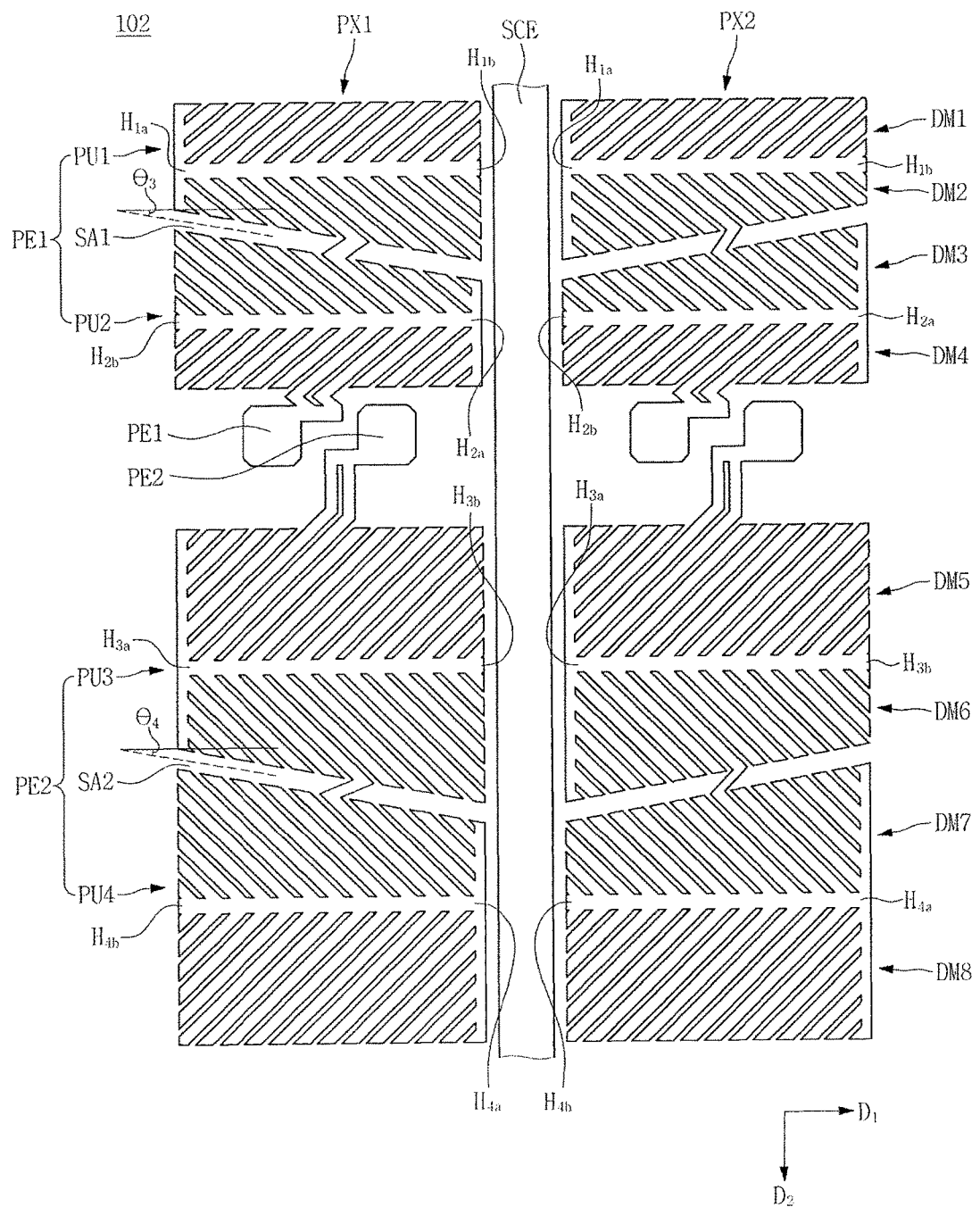
FIG. 8 illustrates a plan view depicting a pixel electrode and a shielding electrode of another exemplary embodiment of an LCD device.

FIG. 8 illustrates a plan view depicting another exemplary embodiment of an LCD device 102. For example, FIG. 8 illustrates a plan view depicting a first sub-pixel electrode PE1, a second sub-pixel electrode PE2, and a shielding electrode SCE.

According to this exemplary embodiment, a width of a second domain DM2 in a first pixel PX1 may increase in relation to a distance from a first vertical stem portion, and a width of a third domain DM3 in the first pixel PX1 may increase in relation to a distance from a second vertical stem portion. A width of a second domain DM2 in a second pixel PX2 that is adjacent to the first pixel PX1 may decrease in relation to a distance from the first vertical stem portion, and a width of a third domain DM3 in the second pixel PX2 may decrease in relation to a distance from the second vertical stem portion.

A width of a sixth domain DM6 in the first pixel PX1 may increase in relation to a distance from a third vertical stem portion, and a width of a seventh domain DM7 in the first pixel PX1 may increase in relation to a distance from a fourth vertical stem portion. A width of a sixth domain DM6 in the second pixel PX2 that is adjacent to the first pixel PX1 may decrease in relation to a distance from the third vertical stem portion, and a width of a seventh domain DM7 in the second pixel PX2 may decrease in relation to a distance from the fourth vertical stem portion.

The first vertical stem portions, the second vertical stem portions, the third vertical stem portion, and the fourth vertical stem portion of the adjacent first and second pixels PX1 PX2 may be disposed so as not to be adjacent to one another. For example, the vertical stem portions of the first pixel PX1 may be adjacent to ends of branch portions disposed in respective unit electrodes of the adjacent second pixel PX2.

For example, an end $H_{1a}$ of the first horizontal stem portion may be connected to the first vertical stem portion VS1, and another end $H_{1b}$ of the first horizontal stem portion may be adjacent to the first vertical stem portion VS1 of an adjacent pixel electrode. An end $H_{2a}$ of the second horizontal stem portion may be connected to the second vertical stem portion, and another end $H_{2b}$ of the second horizontal stem portion may be adjacent to the second vertical stem portion of an adjacent pixel electrode. An end $H_{3a}$ of the third horizontal stem portion may be connected to the third vertical stem portion, and another end $H_{3b}$ of the third horizontal stem portion may be adjacent to the third vertical stem portion of an adjacent pixel electrode. An end $H_{4a}$ of the fourth horizontal stem portion may be connected to the fourth vertical stem portion, and another end $H_{4b}$ of the fourth horizontal stem portion may be adjacent to the fourth vertical stem portion of an adjacent pixel electrode.

Hereinafter, stages of a method of manufacturing an LCD device will be described with reference to FIGS. 9A, 9B, 9C, 9D, 9E, 9F, 9G, and 9H. For ease of description, stages of the method of manufacturing an exemplary embodiment of the LCD device 101 will be described with respect to cross-sectional views taken along line I-I' and II-II' of FIG. 2.

Figure 9A:
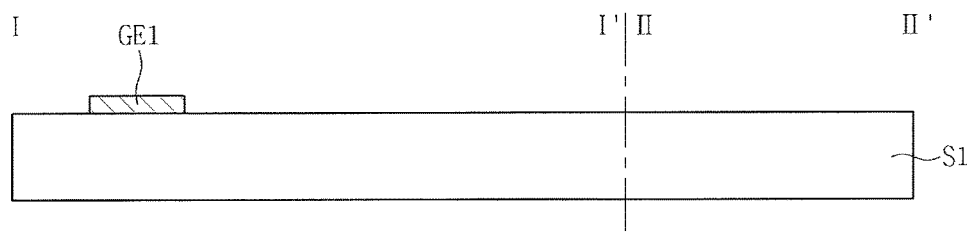
FIGS. 9A, 9B, 9C, 9D, 9E, 9F, 9G, and 9H illustrate views depicting stages of a process of manufacturing the LCD device illustrated in FIG. 1.

Referring to FIG. 9A, the first gate electrode GE1 may be formed on the base substrate S1, which may include transparent glass or plastic. The gate line GL (see FIG. 2) and the second gate electrode GE2 may be formed together.

The gate line GL and the first and second gate electrodes GE1 and GE2 are described hereinabove, and thus, to avoid redundancy, descriptions pertaining thereto will not be repeated.

Figure 9B:
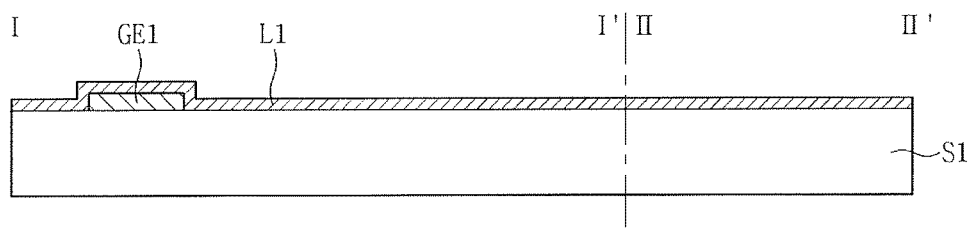

Referring to FIG. 9B, the first insulating layer L1 including silicon nitride (SiNx) or silicon oxide (SiOx) may be disposed on the exposed portions of the base substrate S1 and on the first gate electrode GE1. The first insulating layer L1 may be a gate insulating layer.

In some implementations, the first insulating layer L1 may have a multilayer structure including two or more insulating layers having different physical or chemical characteristics.

Figure 9C:
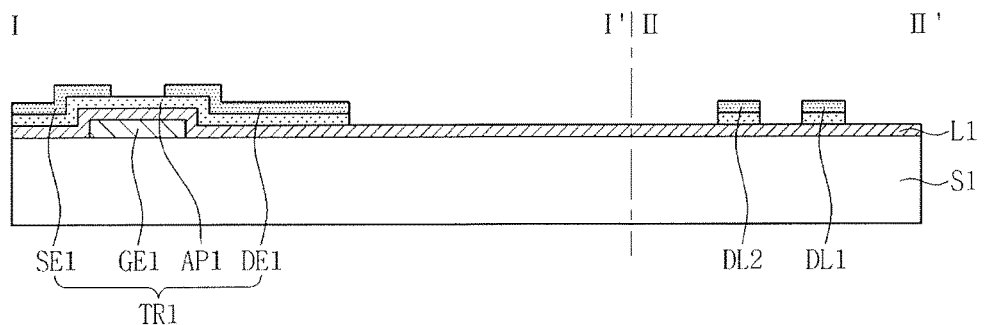

Referring to FIG. 9C, a first active pattern AP1 may be formed on the first insulating layer L1, and a first source electrode SE1 and a first drain electrode DE1 may be formed thereon, such that the first thin film transistor TR1 is provided. The first data line DL1 and the second data line DL2 may be formed together.

For example, a semiconductor material for forming a first active pattern AP1 may be coated over an entire surface of the first insulating layer L1, and a conductive material may be coated thereon. A photoresist may be disposed thereon, and through selective exposure, developing, and etching, the first thin film transistor TR1 may be provided. A silicon-based semiconductor material such as amorphous silicon or crystalline silicon, an oxide semiconductor material, or a compound semiconductor material may be used as the semiconductor material. The conductive material may include at least one selected from molybdenum (Mo), chromium (Cr), titanium (Ti), tantalum (Ta), aluminum (Al), silver (Ag) and copper (Cu).

Figure 9D:
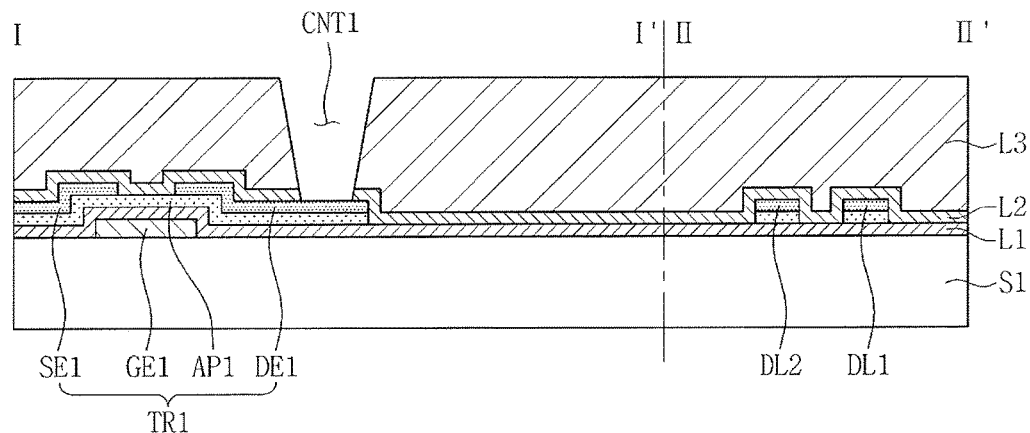

Referring to FIG. 9D, the second insulating layer L2 and the third insulating layer L3 may be sequentially disposed over an entire surface of a substrate including the first thin film transistor TR1, and portions of the second insulating layer L2. A portion of the third insulating layer L3 may be removed, such that the first contact hole CNT1 exposing a portion of the first drain electrode DE1 is defined.

Figure 9E:
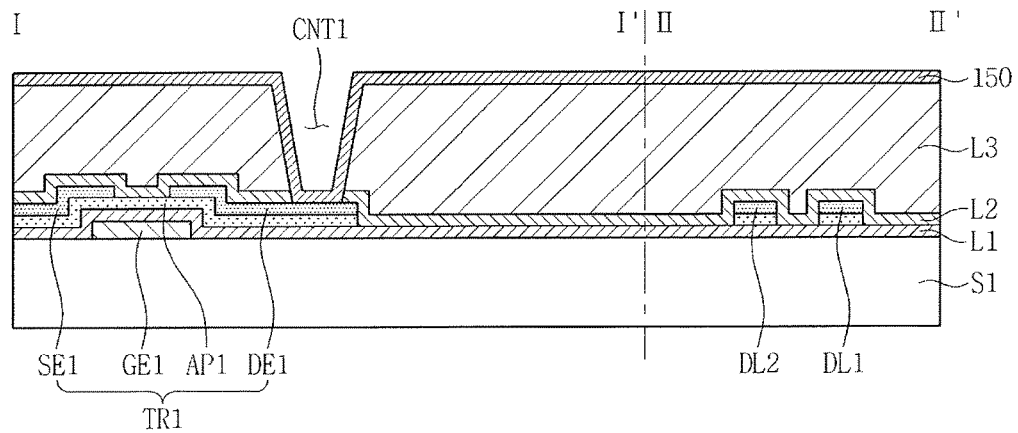

Referring to FIG. 9E, a pixel electrode-forming material 150 may be disposed on the third insulating layer L3 and an entire portion of the first contact hole CNT1. A transparent conductive oxide such as indium tin oxide (ITO), indium zinc oxide (IZO), aluminum zinc oxide (AZO), or indium gallium zinc oxide (IGZO) may be used as the pixel electrode-forming material 150.

Figure 9F:
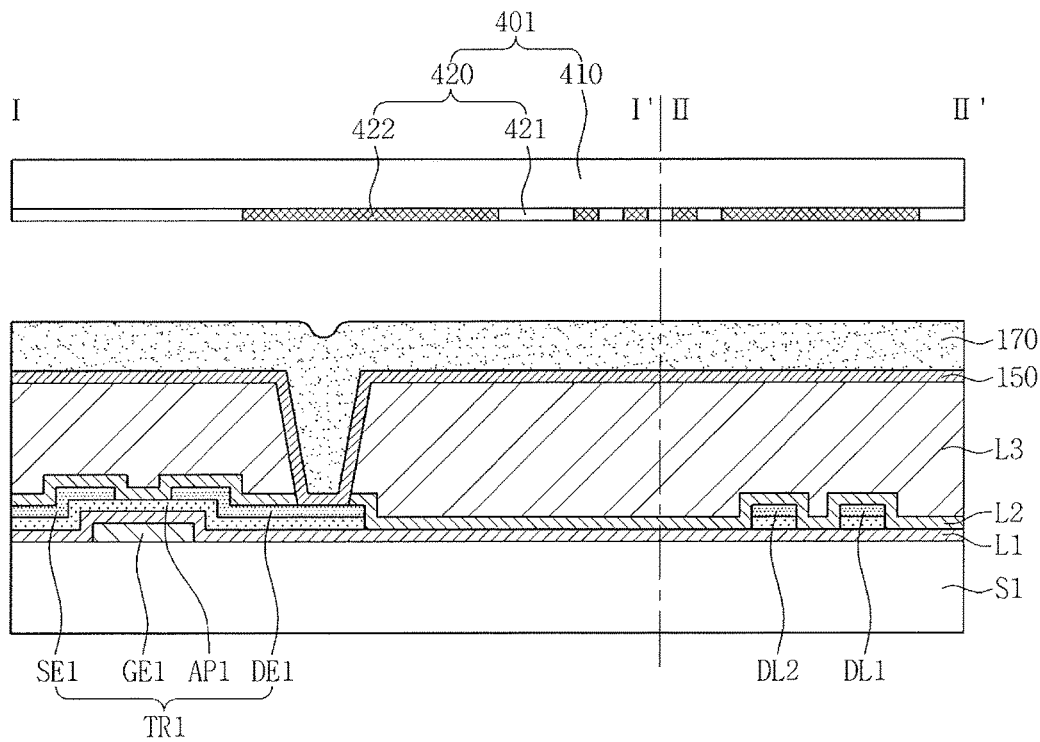

Referring to FIG. 9F, the photoresist 170 may be coated over the pixel electrode-forming material 150, and a pattern mask 401 may be disposed above the photoresist 170 to be spaced apart from the photoresist 170. Subsequently, light may be irradiated through the pattern mask 401 such that the photoresist 170 is exposed in a selective manner.

A suitable photoresist may be used as the photoresist 170. For example, a positive-type photoresist, the etching level of which is increased by light irradiation, may be used as the photoresist 170.

The pattern mask 401 may include a transparent base 410 and a light transmissive pattern unit 420. The light transmissive pattern unit 420 may include a transmissive portion 421 and a blocking portion 422.

Figure 9G:
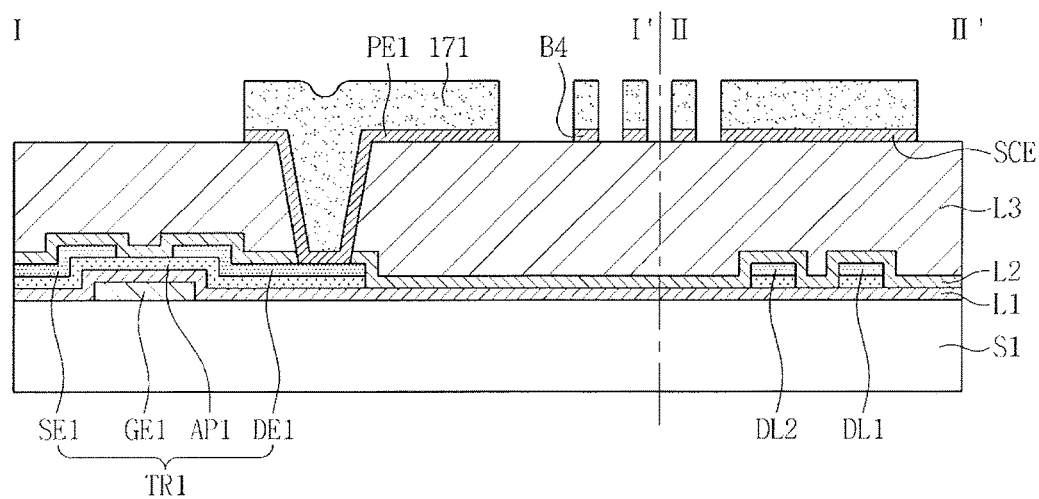

Referring to FIG. 9G, the photoresist 170 that is exposed in a selective manner may be developed to thereby form a photoresist pattern 171. By performing etching using the photoresist pattern 171, the first sub-pixel electrode PE1 and the shielding electrode SCE may be simultaneously formed. When the first sub-pixel electrode PE1 and the shielding electrode SCE are formed, other branch portions including the plurality of fourth branch portions B4 may be simultaneously formed.

Figure 9H:
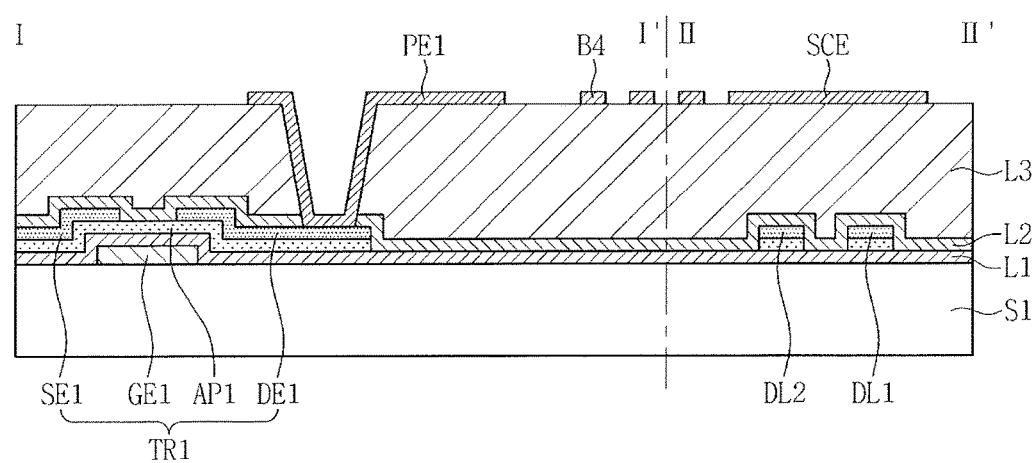

Referring to FIG. 9H, the photoresist pattern 171 may be removed such that the first sub-pixel electrode PE1 and the shielding electrode SCE are provided.

The first alignment layer 110 shown in FIGS. 4 and 5 may be disposed on the first sub-pixel electrode PE1 and the shielding electrode SCE such that the display substrate 100 is provided.

Subsequently, the opposing substrate 300 may be disposed on the display substrate 100 and the liquid crystal layer LC may be interposed between the display substrate 100 and the opposing substrate 300 such that the LCD device 101 may be provided.

By way of summation and review, an LCD device according to embodiments may provide excellent image quality, and more particularly, may provide a high-quality image on the display area having a curved shape. In addition, in the case that one or more exemplary embodiments of the pixel electrode is applied to the LCD device, defects may be significantly reduced in a process of manufacturing the display substrate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display substrate, comprising:
a base substrate including a plurality of pixel areas disposed in a first direction;
a gate line on the base substrate;
a data line on the base substrate, the data line crossing the gate line;
a switching element connected to the gate and the data lines; and
a pixel electrode in a pixel area of the plurality of pixel areas, the pixel electrode connected to the switching element, wherein:
the pixel electrode includes a first sub-pixel electrode, the first sub-pixel electrode including:
a first unit electrode,
a second unit electrode spaced apart from the first unit electrode,
a first connector connecting the first unit electrode and the second unit electrode, and
a first slit providing a distanced space between the first unit electrode and the second unit electrode, the first slit being not parallel to the first direction,
the first unit electrode includes a first vertical stem portion at a side of the pixel area, and a first horizontal stem portion connected to the first vertical stem portion,
the second unit electrode includes a second vertical stem portion at another side of the pixel area, and a second horizontal stem portion connected to the second vertical stem portion, the first horizontal stem portion includes an end connected to the first vertical stem portion and another end adjacent to a first vertical stem portion of an adjacent pixel electrode,
the second horizontal stem portion includes an end connected to the second vertical stem portion and another end adjacent to a second vertical stem portion of another adjacent pixel electrode,
the first vertical stem portion is parallel to the data line,
the first horizontal stem portion is parallel to the gate line,
the first slit is not parallel to the gate and data lines, and
the first slit is not perpendicular to the gate and data lines.

2. The display substrate as claimed in claim 1, wherein:
the first unit electrode includes a plurality of first branch portions and a plurality of second branch portions that oppose one another, respectively, with respect to the first horizontal stem portion, and
the second unit electrode includes a plurality of third branch portions and a plurality of fourth branch portions that oppose one another, respectively, with respect to the second horizontal stem portion.

3. The display substrate as claimed in claim 2, wherein the first branch portions, the second branch portions, the third branch portions, and the fourth branch portions are disposed sequentially in a second direction that intersects the first direction.

4. The display substrate as claimed in claim 2, wherein:
a width of a second domain, which is defined as a disposition area of the plurality of second branch portions, decreases in relation to a distance from the first vertical stem portion, and
a width of a third domain, which is defined as a disposition area of the plurality of third branch portions, decreases in relation to a distance from the second vertical stem portion.

5. The display substrate as claimed in claim 2, wherein:
a width of a second domain, which is defined as a disposition area of the plurality of second branch portions, increases in relation to a distance from the first vertical stem portion, and
a width of a third domain, which is defined as a disposition area of the plurality of third branch portions, increases in relation to a distance from the second vertical stem portion.

6. The display substrate as claimed in claim 2, wherein at least one second branch portion of the plurality of second branch portions and at least one third branch portion of the plurality of third branch portions are connected to one another by the first connector.

7. The display substrate as claimed in claim 1, wherein the first slit is at an angle ranging from about 5° to about 45° with respect to the first direction.

8. The display substrate as claimed in claim 1, wherein:
the pixel electrode further includes a second sub-pixel electrode, the second sub-pixel electrode including:
a third unit electrode;
a fourth unit electrode spaced apart from the third unit electrode;
a second connector connecting the third unit electrode and the fourth unit electrode, and
a second slit providing a distanced space between the third unit electrode and the fourth unit electrode, the second slit being not parallel to the first direction,
the third unit electrode includes a third vertical stem portion at a side of the pixel area and a third horizontal stem portion connected to the third vertical stem portion,
the fourth unit electrode includes a fourth vertical stem portion at another side of the pixel area and a fourth horizontal stem portion connected to the fourth vertical stem portion,
the third horizontal stem portion includes an end connected to the third vertical stem portion and another end adjacent to a third vertical stem portion of the adjacent pixel electrode, and
the fourth horizontal stem portion includes an end connected to the fourth vertical stem portion and another end adjacent to a fourth vertical stem portion of the other adjacent pixel electrode.

9. The display substrate as claimed in claim 8, wherein:
the third unit electrode includes a plurality of fifth branch portions and a plurality of sixth branch portions that oppose one another, respectively, with respect to the third horizontal stem portion, and
the fourth unit electrode includes a plurality of seventh branch portions and a plurality of eighth branch portions that oppose one another, respectively, with respect to the fourth horizontal stem portion.

10. The display substrate as claimed in claim 9, wherein the fifth branch portions, the sixth branch portions, the seventh branch portions, and the eighth branch portions are disposed sequentially in a second direction that intersects the first direction.

11. The display substrate as claimed in claim 9, wherein:
a width of a sixth domain, which is defined as a disposition area of the plurality of sixth branch portions, decreases in relation to a distance from the third vertical stem portion, and
a width of a seventh domain, which is defined as a disposition area of the plurality of seventh branch portions, decreases in a direction from the fourth vertical stem portion.

12. The display substrate as claimed in claim 9, wherein:
a width of the sixth domain, which is defined as a disposition area of the plurality of sixth branch portions, increases in relation to a distance from the third vertical stem portion, and
a width of the seventh domain, which is defined as a disposition area of the plurality of seventh branch portions, increases in relation to a distance from the fourth vertical stem portion.

13. The display substrate as claimed in claim 9, wherein at least one sixth branch portion of the plurality of sixth branch portions and at least one seventh branch portion of the plurality of seventh branch portions are connected to one another by the second connector.

14. The display substrate as claimed in claim 8, wherein the second slit is at an angle ranging from about 5° to about 45° with respect to the first direction.

15. The display substrate as claimed in claim 1, further including a shielding electrode between pixel electrodes that are adjacent to one another, the shielding electrode extending along the first direction.

16. A liquid crystal display (LCD) device, comprising:
a display substrate;
an opposing substrate opposing the display substrate; and
a liquid crystal layer between the display substrate and the opposing substrate, wherein:
the display substrate includes a base substrate including a plurality of pixel areas disposed in a first direction, a gate line, a data line crossing the gate line, a switching element connected to the gate and the data lines, and a pixel electrode in the pixel area, the pixel electrode connected to the switching element, the pixel electrode includes a first sub-pixel electrode, the first sub-pixel electrode including
  a first unit electrode,
  a second unit electrode spaced apart from the first unit electrode,
  a first connector connecting the first unit electrode and the second unit electrode, and
  a first slit providing a distanced space between the first unit electrode and the second unit electrode, the first slit being not parallel to the first direction,
the first unit electrode includes a first vertical stem portion at a side of the pixel area and a first horizontal stem portion connected to the first vertical stem portion,
the second unit electrode includes a second vertical stem portion at another side of the pixel area and a second horizontal stem portion connected to the second vertical stem portion,
the first horizontal stem portion includes an end connected to the first vertical stem portion and another end adjacent to a first vertical stem portion of an adjacent pixel electrode,
the second horizontal stem portion includes an end connected to the second vertical stem portion and another end adjacent to a second vertical stem portion of another adjacent pixel electrode,
the first vertical stem portion is parallel to the data line,
the first horizontal stem portion is parallel to the gate line,
the first slit is not parallel to the gate and data lines, and
the first slit is not perpendicular to the gate and data lines.

17. The LCD device as claimed in claim 16, wherein:
the first unit electrode includes a plurality of first branch portions and a plurality of second branch portions that oppose one another, respectively, with respect to the first horizontal stem portion, and
the second unit electrode includes a plurality of third branch portions and a plurality of fourth branch portions that oppose one another, respectively, with respect to the second horizontal stem portion.

18. The LCD device as claimed in claim 17, wherein:
a width of a second domain, which is defined as a disposition area of the plurality of second branch portions, decreases in relation to a distance from the first vertical stem portion, and
a width of a third domain, which is defined as a disposition area of the plurality of third branch portions, decreases in relation to a distance from the second vertical stem portion.

19. The LCD device as claimed in claim 17, wherein a width of a second domain, which is defined as a disposition area of the plurality of second branch portions, increases in relation to a distance from the first vertical stem portion, and
a width of a third domain, which is defined as a disposition area of the plurality of third branch portions, increases in relation to a distance from the second vertical stem portion.

20. The LCD device as claimed in claim 16, wherein the opposing substrate further includes a common electrode.

* * * * *